United States Patent [19]
Markow et al.

[11] Patent Number: 5,542,280
[45] Date of Patent: Aug. 6, 1996

[54] AUTOMATED GAUGE, ASSESSMENT SYSTEM AND METHOD

[75] Inventors: Paul A. Markow; Theodore M. Cummings, both of Huntsville, Ala.; William D. DeBardelaben, South St. Paul, Minn.; John H. McElreath, Huntsville; William Nolle, Hazel Green, both of Ala.

[73] Assignee: Chrysler Corporation, Auburn Hills, Mich.

[21] Appl. No.: 370,087

[22] Filed: Jan. 9, 1995

[51] Int. Cl.$^6$ ............................. G01D 5/30; G01D 9/42; G01P 1/11; G01P 21/02
[52] U.S. Cl. ............................................ 73/1 R; 73/2
[58] Field of Search ............................. 73/1 R, 2, 866.1

[56] References Cited

U.S. PATENT DOCUMENTS

| | | | |
|---|---|---|---|
| 2,127,272 | 8/1938 | Schweisthal et al. | 73/2 |
| 3,276,240 | 10/1966 | Thies | 73/2 |
| 3,609,376 | 9/1971 | Seely et al. | 73/1 R X |
| 3,825,810 | 7/1974 | Helmschrott | 318/618 |
| 4,561,057 | 12/1985 | Haley, Jr. et al. | 364/436 |
| 4,581,762 | 4/1986 | Lapidus et al. | 382/22 |
| 5,068,908 | 11/1991 | Inoue et al. | 382/48 |
| 5,077,806 | 12/1991 | Peters et al. | 382/9 |
| 5,185,700 | 2/1993 | Bezos et al. | 364/424.04 |

FOREIGN PATENT DOCUMENTS

| | | | |
|---|---|---|---|
| 482682 | 12/1975 | U.S.S.R. | 73/2 |
| 2280268 | 1/1995 | United Kingdom | 73/2 |

*Primary Examiner*—Thomas P. Noland
*Attorney, Agent, or Firm*—Christopher A. Taravella

[57] ABSTRACT

A gauge, system and method are disclosed for determining the accuracy and performance of a gauge by determining the angular deflection of the gauge needle in response to a known input signal. A frequency generator supplies a predetermined frequency signal or a controller supplies an input signal to a gauge motor which causes deflection of the gauge needle. A video camera is used to capture a video frame corresponding to the visual data indicating the needle deflection. The needle includes a head portion and a remote portion, such as a hub or tail, which show up as high intensity values against the low intensity background in the video frame. The pixel intensity values around the perimeter of a selected portion of the frame are scanned to determine the location of maximum intensity pixels which correspond to either the head or the remote portion of the needle. Alternatively, the image is scanned in terms of color. By ascertaining the locations of the head and the remote portion, the exact deflection of the needle can be quickly and accurately determined. This deflection is then compared against the expected deflection based on the known input signal. If the deviation between the two values is not within an acceptable range, the particular gauge is rejected. The deviation may also be used to calibrate the gauge, for example, by realigning the needle or by storing one or more compensation values to be used by the gauge.

34 Claims, 8 Drawing Sheets

FLOW FOR DETERMINING ANGLE

START
- capture a frame of video
- read YLO row
- read YHI row
- read XLO column
- read XHI column scan permiter of rectangle
- for MAX intensity point determine ANGLE
- from center of rectangle to MAX intensity
- point set SWEEP RADIUS to 180 pixels
- set SWEEP ANGLE to ANGLE - 20° calculate
- pixel coordinates that is a distance
    of RADIUS pixels from the center
    of the rectangle and at an angle of SWEEP
- ANGLE taking into account aspect ratio read
- pixel value and store in gamma array increment
- SWEEP ANGLE by 1° is SWEEP ANGLE greater than
- ANGLE + 20°? set SWEEP ANGLE TO ANGLE - 200°
- calculate pixel coordinates that is a distance
    of RADIUS pixels from the center of the
    rectangle and at an angle of SWEEP ANGLE
- taking into account aspect ratio read pixel
- value and store in beta array increment SWEEP
- ANGLE by 1° is SWEEP ANGLE greater than
- ANGLE - 160°?scan gamma array and find
- MAX and MIN intensity points scan beta array
- and find MAX and MIN intensity points
- establish gamma threshold intensity value
    = 0.7 • (MAX-MIN) + MIN establish beta
  threshold intensity value
    = 0.7 • (MAX - MIN) + MIN TO a IN FIGURE 9b

FIGURE 9a

AUTOMATED GAUGE, ASSESSMENT SYSTEM AND METHOD

FIELD OF THE INVENTION

The present invention generally relates to the field of automatic test equipment, and more specifically, to a gauge and a system and method for reading gauges, such as speedometer gauges or instrument clusters.

BACKGROUND OF THE INVENTION

Gauges, for example, speedometer gauges, are commonly used to indicate the speed of moving and/or rotating objects. A typical application for a speedometer gauge is in an automobile where it is used to indicate the speed of the automobile. The speedometer determines the speed of the automobile using wheel sensors which indicate the number of revolutions of the wheel. Since the circumference of the wheel is usually a known, fixed parameter (assuming that original equipment tires or their size equivalent are being used, and that they are properly inflated) the frequency of the wheel sensor signals which normally represent revolutions per unit time interval, can be converted to indicate distance travelled per unit time interval, i.e., speed or velocity.

For example, in the case of an automobile wheel with a circumference of six feet which rotates eight times per second, the wheel speed is:

(6 feet/rotation).(8 rotations/second).(3600 seconds/hour).(1 mile/5280 feet)=32.7 miles/hour On a deflection—type or analog gauge, this signal is converted to an equivalent mechanical force (using a motor) which is applied to a needle in order to deflect the needle the angular distance corresponding to the equivalent wheel speed, as indicated by the circumferential speed markings placed around the periphery of the speedometer gauge.

Gauges, for example, speedometer gauges or instrument clusters, such as those used in automobiles are typically mass produced using a number of individual components, e.g., wheel sensors, needles, and motors. These components typically have variations from part to part and from lot to lot, with the result being that the finished speedometer gauges vary in performance. In other words, a given speed will be displayed differently on different speedometer gauges due to the component variation. This situation is extremely undesirable for such a sensitive instrument whose accuracy is relied upon for safety reasons, performance reasons and of course, legal reasons. Accordingly, it is necessary to test a statistically significant number of speedometer gauges manufactured in order to determine their accuracy. Based on this accuracy testing, only those speedometer gauges exhibiting sufficient accuracy within a given tolerance (e.g., 1–2 miles per hour) will be retained. The remaining speedometer gauges are rejected as being inaccurate.

The foregoing accuracy test may be carded out by applying a known input signal to the speedometer gauge to simulate a known wheel velocity, and visually observing the output of the speedometer, i.e., the speed indicated by the speedometer gauge. Although such an approach is very effective, it is nevertheless extremely tedious and time consuming. As with other tedious and time consuming tasks which happen to be repetitive in nature, such a task lends itself to automation. However, when using automated techniques, the visual assessment made by an operator must now be made by a machine, i.e., the speed indicated by the speedometer gauge must be "read" and a determination made as to whether or not the particular speedometer is within the acceptable range of accuracy.

Visual inspection or object identification systems are often used for similar tasks. For example, U.S. Pat. No. 4,581,762 to Lapidus et at. discloses an automated object identification system which compares unknown objects to a known reference object. The comparison or identification includes selecting three points on the known object and calculating the gradient information around each point. Each of the three areas of gradient information is compared to an image of the known object. If "good" correlation is found in the image of the unknown object, then the unknown object has been identified as matching the known object. Additionally, the angular displacement of the three points on the unknown object is used to determine the orientation of the unknown object.

Similarly, U.S. Pat. No. 5,077,806 to Peters et at. discloses an object identification system used to identify a particular object by producing an image of the object and then counting the number of "on" pixels in each line of the image. This characteristic information is then used to identify the particular object.

Although the above-described systems may be used to visually identify objects, they are not readily applicable to the visual assessment of the performance and accuracy of mass produced gauges. Peters et at. merely identify an object and provide no information whatsoever that can be used to visually assess a speedometer gauge. Although Lapidus et at. may be used to determine angular displacement of a speedometer, such a system is extremely complex and computation-intensive in that it requires a detailed calculation of several gradients. Furthermore, this latter system requires elaborate illumination techniques used for edge detection.

SUMMARY OF THE INVENTION

It is an object of the present invention to provide an automated system and method for visually determining the accuracy and performance of a gauge or instrument cluster.

In accordance with an illustrative embodiment of the present invention, there is provided a system and method for determining the accuracy and performance of a speedometer gauge by determining the angular deflection of the speedometer gauge needle in response to an input signal representative of a known vehicle speed. Each frame corresponding to the visual data indicating the needle deflection is captured by a camera. The needle has identifying markings to distinguish both the head and the tail. These markings show up as high intensity values against the low intensity background of the frame. The pixel intensity values around the perimeter of a selected portion of the frame are scanned to determine the location of a maximum intensity pixel which corresponds to either the head or the tail of the needle.

At this stage it is not known whether this pixel is part of the head or the tail. Accordingly, the pixels adjacent the maximum intensity pixel as well as those 180° away are scanned in order to determine whether the first found maximum intensity pixel is part of the identifying markings of the head or the tail. In this way, by ascertaining the locations of the head and the tail, the exact deflection of the speedometer needle can be quickly and accurately determined. This deflection is then compared against the expected deflection based on the known input signal. If the deviation between the two values is not within an acceptable range, the particular speedometer is rejected.

The deviation may also be used to calibrate the speedometer gauge, for example, by realigning the needle, or by storing one or more compensation values to be used by the speedometer gauge when in use.

BRIEF DESCRIPTION OF THE DRAWINGS

The foregoing and other features of the present invention will be more readily apparent from the following detailed description of the preferred embodiments taken in conjunction with the attached drawings, wherein:

FIGS. 9a and 9b are flowcharts of the method according to one embodiment of the present invention.

DETAILED DESCRIPTION OF AN ILLUSTRATIVE EMBODIMENT

Figure 1:
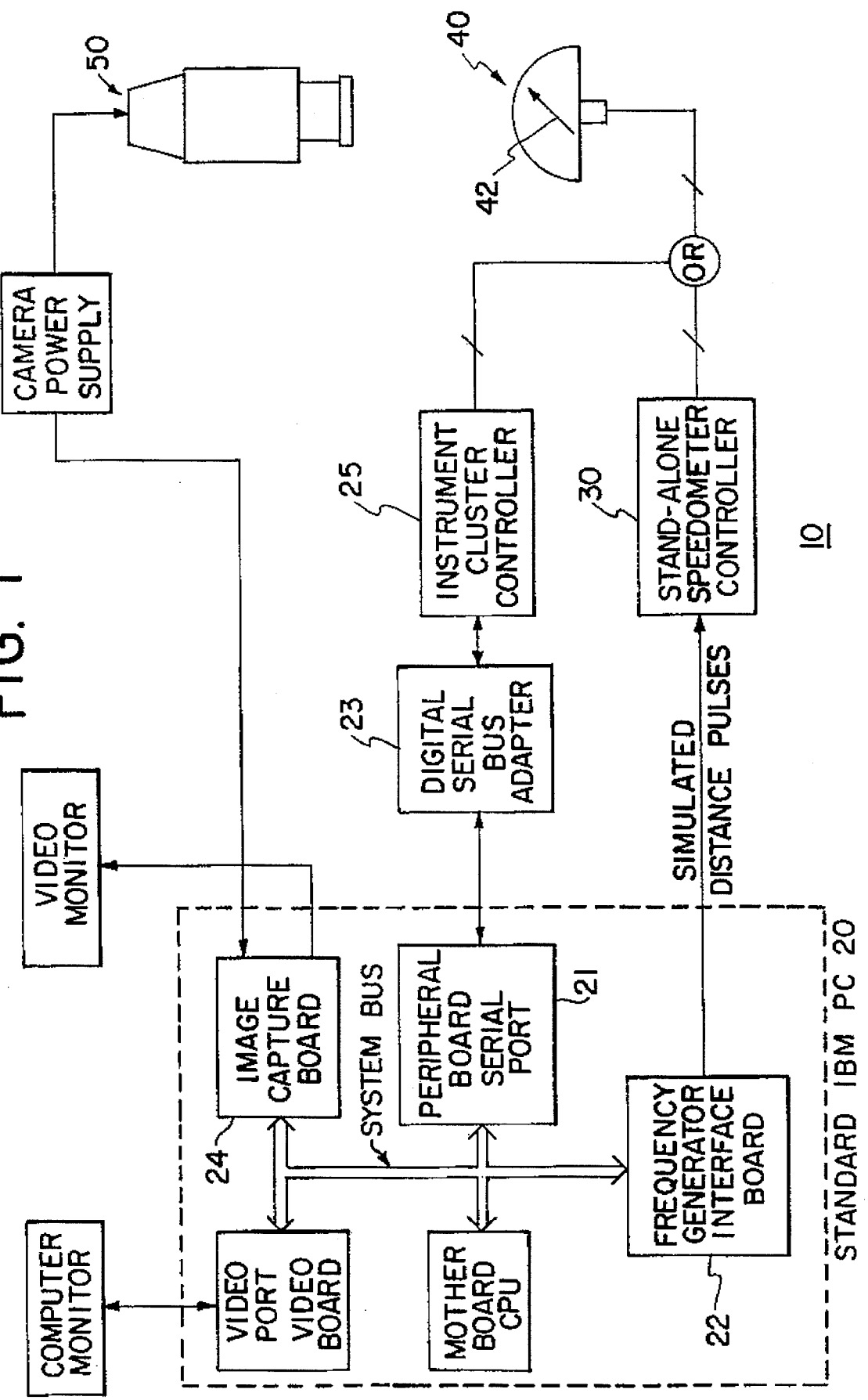
FIG. 1 is an overall view of the system according to the present invention.

FIG. 1 illustrates an automated speedometer gauge reading system according to the present invention. The system 10 includes a controller 20 which may be a computer or equivalent device. The controller 20 generates a control signal, such as a periodic square wave signal, to provide the desired needle deflection. This is accomplished by the controller 20 generating frequency commands to a frequency generator interface board 22 which is provided as part of the controller 20. The frequency generator interface board 22 generates the appropriate periodic signal based on the frequency commands from the controller 20 and provides the signal to speedometer controller 30. Speedometer controller 30 then produces a corresponding control signal to the speedometer unit 40 under test. This control signal causes speedometer needle 42 to be deflected a certain angular distance. Alternatively, the control provides a digital signal via peripheral board serial port 21 and digital serial bus adapter 23 to instrument cluster controller 25. Instrument cluster controller 25 then converts the digital signal from the controller 20 into an appropriate analog signal which is used to drive the gauge 40.

Video camera 50 captures the image of the speedometer with the needle deflected and provides the image to an image capture board 24, which may be provided as part of controller 20. Image capture board 24 essentially functions as a conventional "frame grabber" or video digitizer. In one embodiment of the present invention, image capture board 24 is a Matrox PIP512B video digitizer available from Matrox Electronic Systems Limited, Dorvai, Quebec, Canada. Controller 20 then analyzes the image, as will be discussed in more detail below, in order to determine the amount of deflection of speedometer needle 42. The needle image is stored for subsequent statistical analysis and processing. The analysis may be carded out in terms of pixel intensities, in which case only one Matrox board is required. Alternatively, the analysis may be carded out in terms of color, in which case three Matrox boards are required. The entire process may be repeatedly carded out in order to evaluate the same unit at the same amount of deflection to assess consistency and/or at different amounts of deflection in order to asses the operating range of the speedometer unit.

Figure 2:
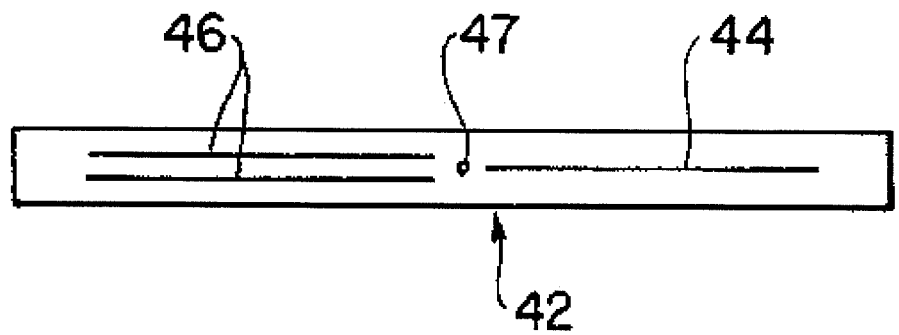
FIG. 2 is an illustration of the speedometer needle according to the present invention.

The analysis of each image will now be described in detail with reference to FIGS. 2 through 9a and 9b. The needle 42 is shown in detail in FIG. 2. As can be seen in FIG. 2, the needle is provided with distinguishing marks at both the head and tail portions. In one embodiment of the present invention, the head portion is provided with a single stripe 44 while the tail portion is provided with dual stripes 46, the stripes having a much higher intensity than the background. These distinguishing marks play a significant role in the analysis of the captured video image which is used to determine the needle deflection.

Figure 3:
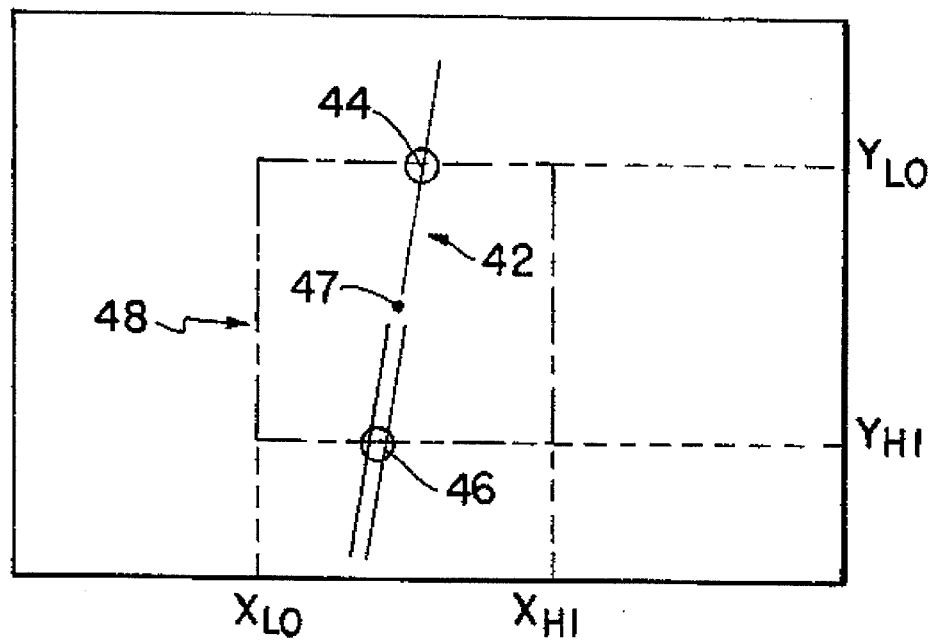
FIG. 3 is a graphical illustration of a selected portion of a frame containing the speedometer needle of FIG. 2.

FIG. 3 shows a portion of a video frame captured by camera 50. The relevant portion of the frame includes needle 42. If the frame image is not square, i.e., scaled evenly in the x and y directions, an appropriate aspect ratio must be established in order to obtain accurate and meaningful results.

In the system of the present invention, it is assumed that the center 47 of the needle 42 will lie within a selected rectangular portion 48 of the frame. The boundaries of this portion 48 are defined horizontally by $X_{LO}$ and $X_{HI}$, and vertically by $Y_{LO}$ and $Y_{HI}$. The dimensions of rectangular portion 48 are preferably less than half the overall X and Y dimensions of the video frame. The pixel intensity values around the perimeter of frame portion 48 are scanned until a maximum intensity pixel is located. Since only the head and tail portions are provided with maximum intensity distinguishing marks 44 and 46, respectively, the maximum intensity pixel located on the perimeter of frame portion 48 will be where either the head or the tail crosses the boundary of the frame portion 48.

Figure 4:
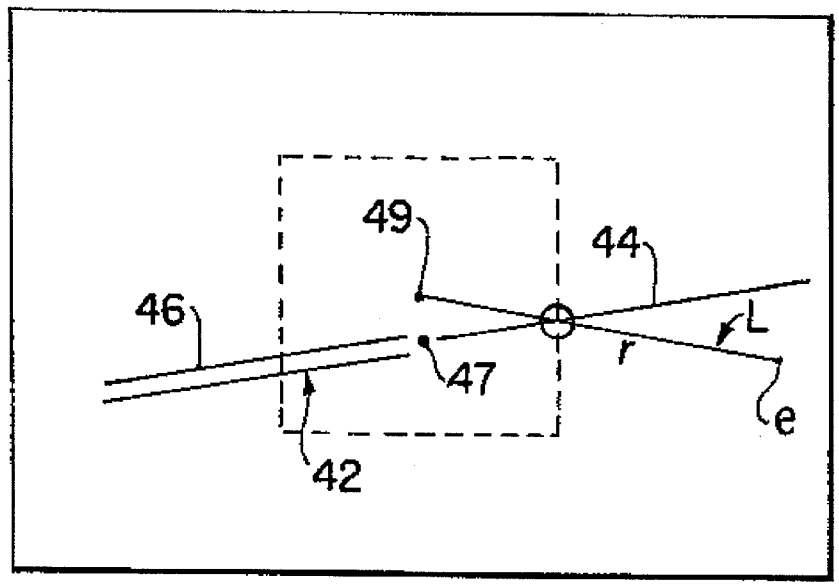
FIG. 4 is a graphical illustration of a frame showing the location of a needle.

In order to determine whether the intercept point or maximum intensity pixel on the frame portion boundary represents the head or the tail, a line L is calculated from the center 49 of the frame portion through the intercept point (FIG. 4). The length r of this line is made as large as possible while still remaining within the frame. The end point e of the line L serves as a reference point for locating the head or tail.

Figure 5:
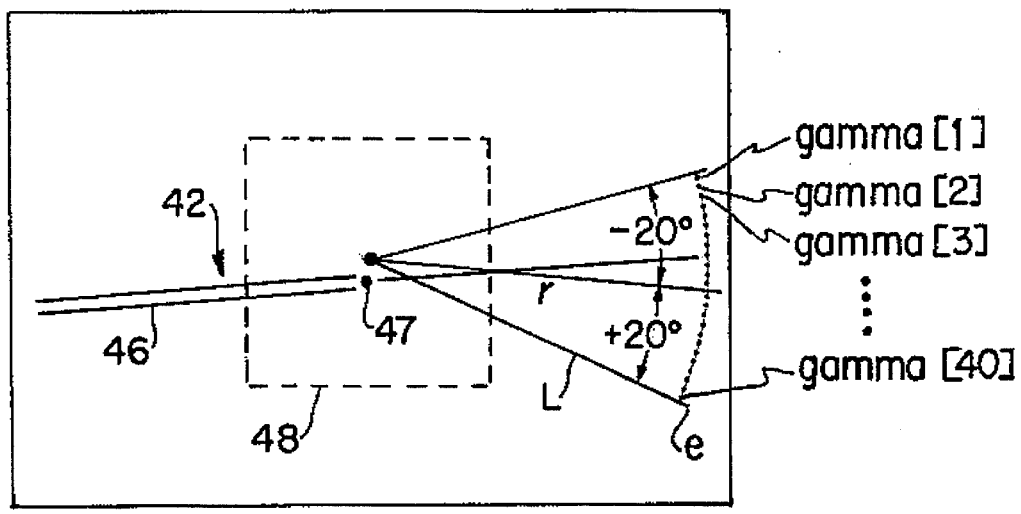
FIG. 5 is a graphical illustration of a frame showing a radial sweep in the area of the needle.

Referring now to FIG. 5, the end point e is swept through an arc, for example ±20° in increments of 1°. At each point along the sweep through the arc, the pixel value intensity at that location is stored in an array called "gamma." The individual values in the gamma array, gamma[1], gamma[2] . . . , are collectively referred to as gamma[n].

Figure 6:
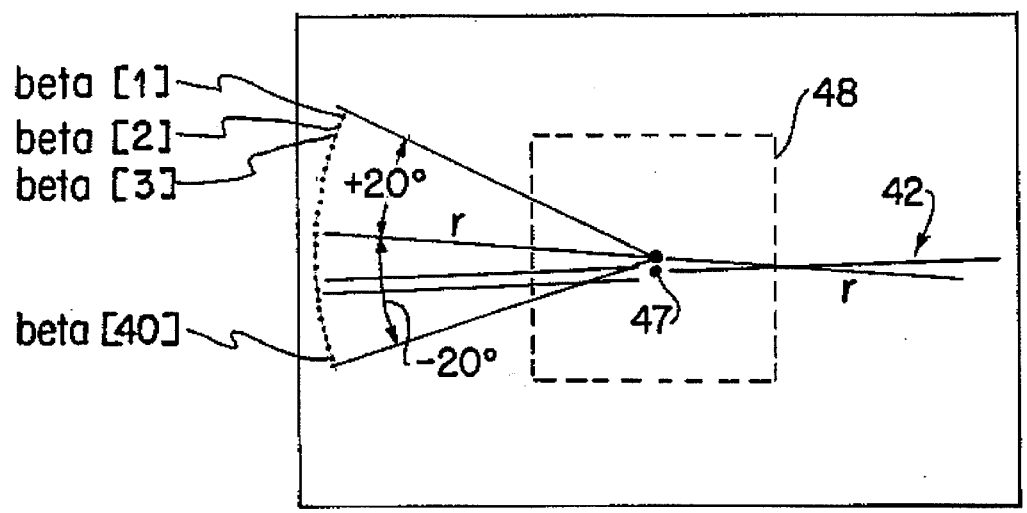
FIG. 6 is a graphical illustration of a frame showing another radial sweep in the area of the needle.

This sweeping process is carried out at the opposite end point of line L, i.e., 180° away, as shown in FIG. 6. The pixel values from the sweep of this opposite arc are stored in an array beta[n].

Figure 7:
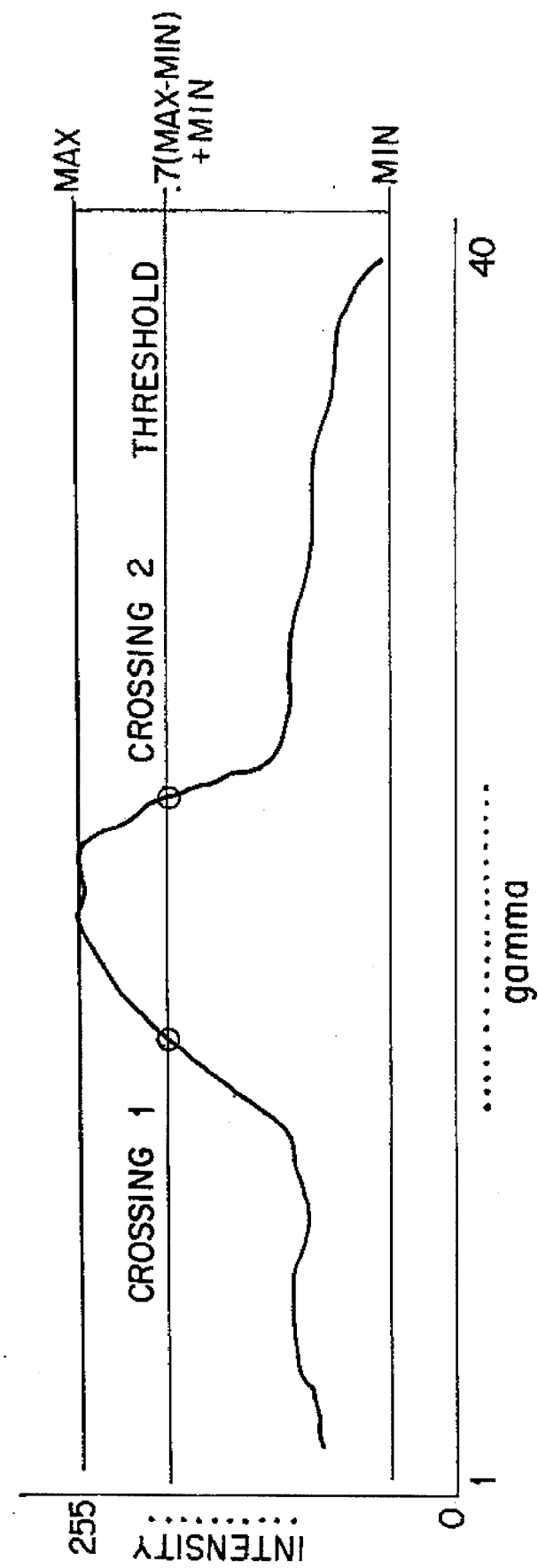
FIG. 7 is a graphical illustration of the pixel intensity values along a radial sweep.
Figure 8:
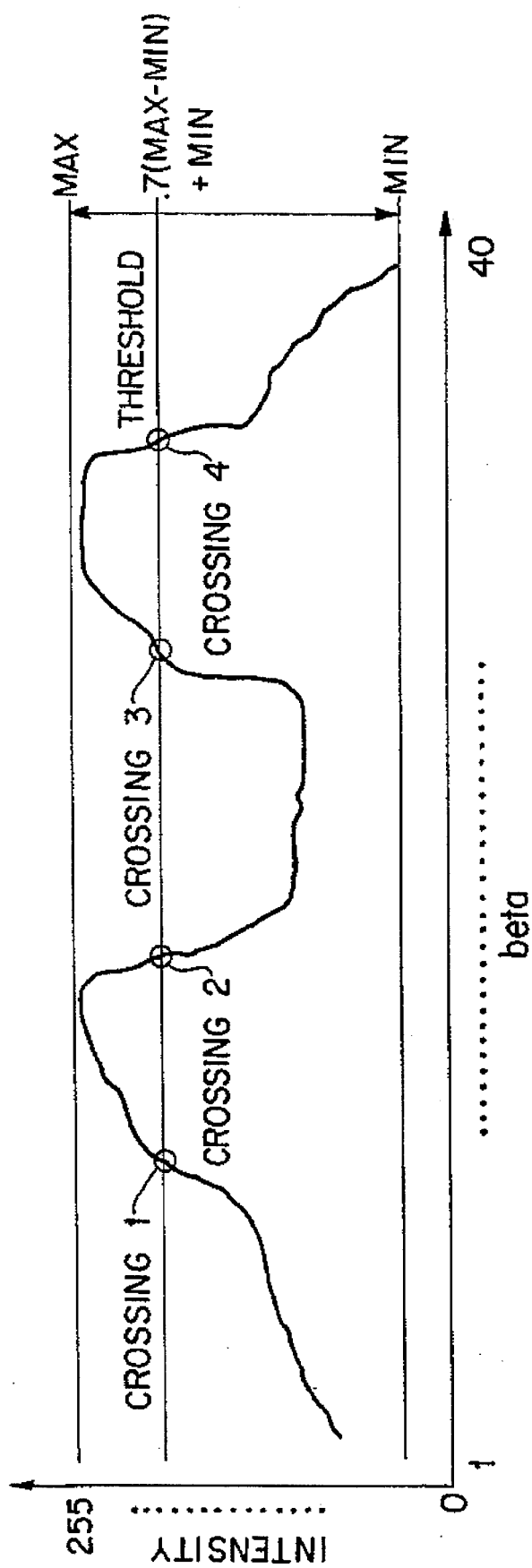
FIG. 8 is another graphical illustration of the pixel intensity values along a radial sweep.

The gamma array and beta array are plotted as a function of pixel location, as shown in FIGS. 7 and 8, respectively. Referring now to FIG. 7, the plot of the gamma array is scanned for maximum and minimum intensity points. These two values are used to calculate a gamma threshold, which, for example may be defined as the minimum intensity value plus 70% of the difference between the maximum and minimum values:

gamma threshold=MIN+0.7(MAX−MIN)

The points where the gamma plot crosses the gamma threshold are recorded. If there are only two crossings, i.e., a single maximum point, then the gamma plot contains the head of the needle. This is because the head portion of the needle 42 contains a single stripe 44. Conversely, if the gamma plot contains four gamma threshold crossings, i.e., two maximum points, then the gamma plot contains the tail of the needle, because the tail portion contains dual stripes 46.

A similar type analysis is carried out on the beta plot (FIG. 8), and if no analysis errors are present, then the results should be complementary, i.e., one of the gamma and beta plots should indicate one maximum point, while the other of the gamma and beta plots should indicate two maximum points. If no errors are detected, the crossing points from the gamma and beta plots are used to determine the coordinates for the head and tail portions of the needle 42. The head and tail coordinates will in turn be used to calculate the needle deflection angle, taking into account any aspect ratio scaling factors. The process described in detail above is shown in flowchart form in FIGS. 9a and 9b.

Figure 2A:
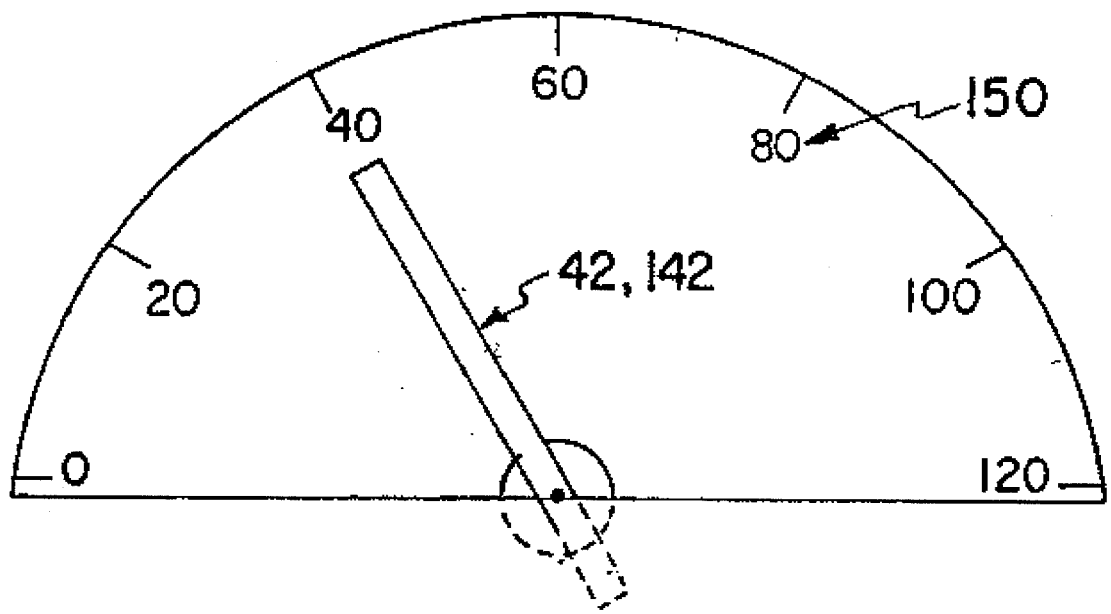
FIG. 2a is an illustration of a speedometer gauge including a needle.

As an example, if the input signal to the speedometer gauge corresponds to a wheel speed of 40 miles per hour, the angle of deflection of the needle, as indicated by the head and tail coordinates is checked to see if the actual deflection of the needle corresponds to a speed in the range of 38–42 miles per hour (in the case of plus or minus 2 miles per hour accuracy). Thus, in the case of a 120 mile per hour semicircular speedometer gauge, such as that shown in FIG. 2a, a speed of 40 miles per hour corresponds to a needle deflection of 60 degrees in a clockwise direction from the horizontal plane. In the speedometer gauge of FIG. 2a, a single mile per hour corresponds to 1.5 angular degrees. Thus, 40 miles per hour corresponds to 60 degrees, and the acceptable range of 38–42 miles per hour corresponds to an angular deflection range of 57–63 degrees. If the angular deflection of the needle, as indicated by the head and tail coordinates, is within the range of 57–63 degrees, then the particular speedometer gauge is accurate.

The present invention may also be used to perform a calibration procedure on those units that are not within the acceptable gauge error range. The calibration procedure is performed in a number of ways. First, if the above procedure indicates an unacceptable gauge error, the needle 42 may be removed from the speedometer gauge 40 and reattached at the proper position corresponding to the predetermined input signal. This type of calibration may be used to correct gauge errors that may arise due to improper initial alignment of the needle 42 on the speedometer gauge 40.

Alternatively, the calibration procedure may involve storing one or more correction or compensation values within each speedometer gauge 40 under test. This type of procedure may be used in conjunction with testing at multiple speeds (discussed below), with a compensation value being stored for each individual test speed. The stored compensation values are then used by the particular speedometer gauge, with the speedometer gauge selecting the appropriate compensation value based on its instantaneous operating speed.

If the analysis of the gamma and beta plots indicates an analysis error, e.g., the proper number of maximum intensity points are not located, then an error message is generated. Such a condition may arise due to improper lighting which in turn may affect the intensity analysis of the image; or alternatively, such an error may be due to improper placement of the rectangular portion 48 within the image, i.e., the image analysis is carried out on an incorrect portion of the frame which does not contain the head and/or tail of the needle (FIG. 4).

The process described above may be carried out for the same deflection angle again in order to ascertain the consistent performance of a unit. Alternatively, the process may be carried out at different deflection angles in order to determine the performance of the unit over a particular operating range. Also, either a single deflection or a range of deflections can be measured for a series of speedometer gauges as part of a quality control procedure in an automated assembly plant.

Figure 10:
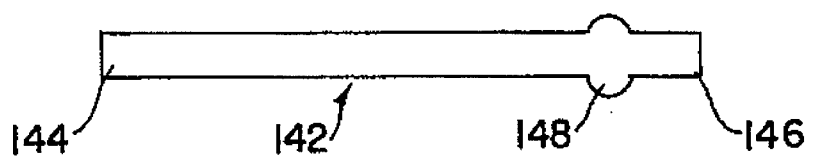
FIG. 10 is an illustration of an alternative speedometer needle according to the present invention.

In an alternative embodiment of the present invention, a different type needle 142 (FIG. 10) may be used. This type of needle may be used in conjunction with a gauge such as that shown in FIG. 2a. Needle 142 includes a relatively long head portion 144, a shorter tail portion 146 and a hub 148 in between the head portion 144 and tail portion 146. When this type of needle is used, the system of the present invention first determines the angular position of the graticles 150 by searching for contrast variations in the area of the expected positions of the graticles. By determining the angular position of the starting and ending points of the speedometer gauge (e.g., 0 MPH and 120 MPH for the gauge illustrated in FIG. 2a), the system can determine the expected position for the hub 148 of the needle 42.

Once the hub 148 has been located, the system searches for the head portion 144 by looking for contrast variations along an arcuate portion of the gauge. It should be noted that the arcuate sweep is carded out at a radial distance which is shorter than the distance from the hub 148 to the graticles 150. Otherwise, the system may erroneously detect the graticles 150 themselves as being the needle 142. The process of locating the head portion of the needle 142 is very similar to the process described above with respect to needle 42, i.e., the system searches for contrast variations between the needle 142 and the background of the speedometer gauge. Contrast variations may be achieved in a number of ways. For example, the needle 142 may be provided with one or more stripes as previously described. Alternatively, the needle 142 may be constructed so as to have a much higher (or lower) intensity value than the background of the speedometer gauge.

Figure 9B:
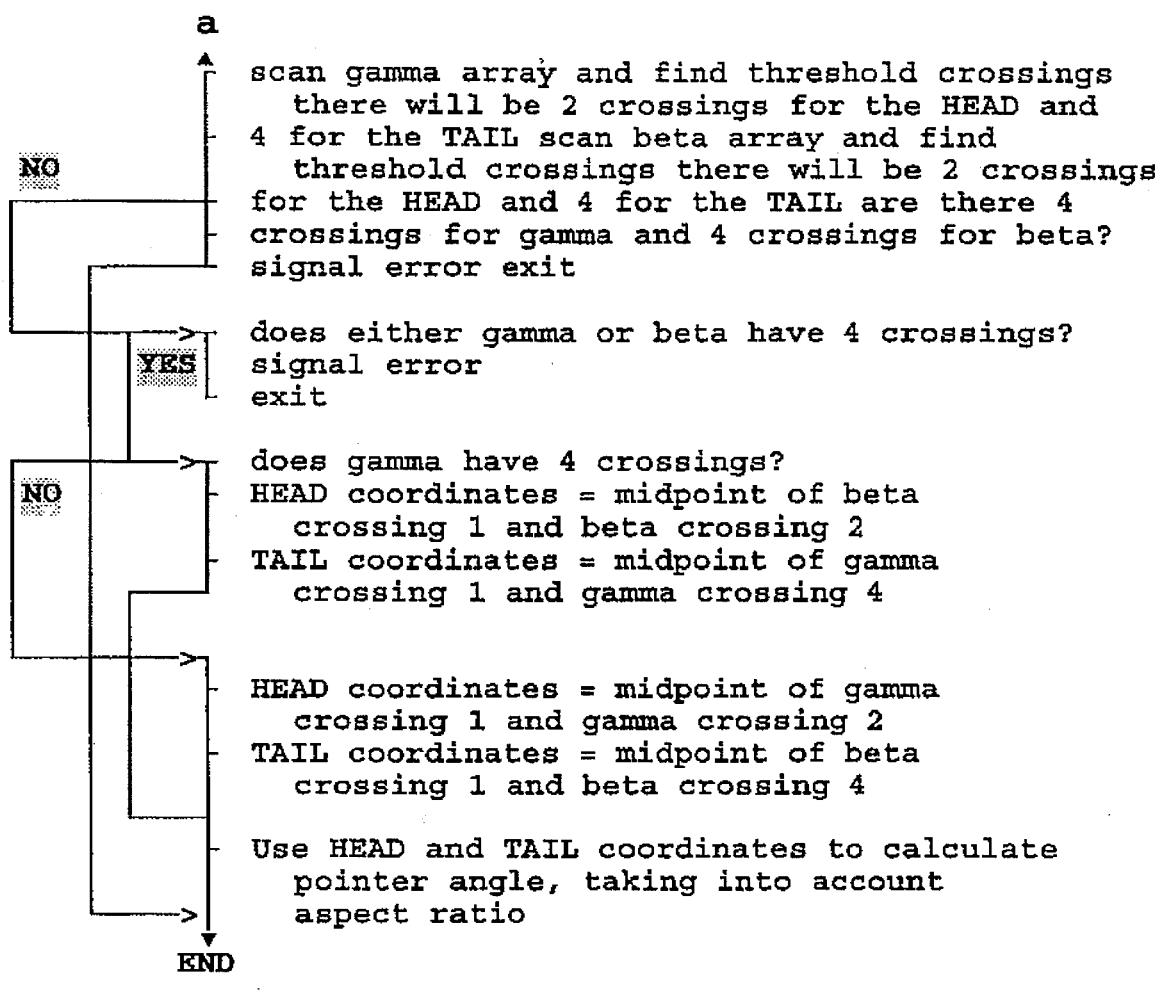

If the present controller 20 is programmed according to the flowchart of FIGS. 9a and 9b, the operation can be carded out automatically for the testing of one or more gauges on one or more instrument clusters.

While the invention has been particularly shown and described with reference to a preferred embodiment thereof, it will be understood by those skilled in the art that various changes in form and details may be made therein without departing from the spirit and scope of the invention. For example, the present invention has been described with reference to a speedometer gauge; however, the present invention is equally applicable to situations involving the visual identification of a moving indicator.

What is claimed is:

1. A gauge assessment apparatus for use with a gauge having a needle that deflects in response to an input control signal, comprising:

means for generating a predetermined gauge input signal;

means for recording a needle deflection of the gauge in response to the predetermined input signal;

means for analyzing the needle deflection to determine locations of a head portion of the gauge needle and a needle portion remote from said head portion to thereby determine the actual needle deflection; and means for comparing the actual needle deflection with an expected needle deflection corresponding to the predetermined gauge input signal to thereby assess the accuracy of the gauge.

2. The gauge assessment apparatus of claim 1, wherein the remote portion is one of a tail portion and a hub portion.

3. The gauge assessment apparatus of claim 2, wherein the means for recording comprises a camera.

4. The gauge assessment apparatus of claim 3, wherein said camera is used to capture a video frame image containing the gauge needle in a deflected state, and wherein the video frame is analyzed in terms of intensity in order to locate the head portion and the remote portion.

5. The gauge assessment apparatus of claim 4, wherein the means for analyzing comprises means for scanning at least a portion of the needle deflection to locate the head portion and the remote portion.

6. The gauge assessment apparatus of claim 5, wherein the means for scanning includes means for detecting maximum intensity locations corresponding to the head portion and the remote portion.

7. The gauge assessment apparatus of claim 3, wherein said camera is used to capture a video frame image containing the gauge needle in a deflected state, and wherein the video frame is analyzed in terms of color in order to locate the head portion and the remote portion.

8. The gauge assessment apparatus of claim 1, wherein the means for recording includes means for scaling the needle deflection.

9. The gauge assessment apparatus of claim 1, wherein the means for comparing further comprises means for calibrating the gauge.

10. The gauge assessment apparatus of claim 9, wherein the means for calibrating further comprises means for storing at least one compensation value, said compensation value being based on said actual needle deflection and said expected needle deflection.

11. The gauge assessment apparatus of claim 9, wherein the means for calibrating further comprises means for realigning said needle.

12. A gauge assessment apparatus for use with a gauge having a needle that deflects in response to an input signal, comprising:

a generator to generate a predetermined gauge input signal;

a recording unit to record a needle deflection of the gauge in response to the predetermined input signal;

a processing unit to analyze the needle deflection to determine locations of a head portion of the gauge needle and a needle portion remote from said head portion to thereby determine the actual needle deflection; and a comparison unit to compare the actual needle deflection with an expected needle deflection corresponding to the predetermined gauge input signal to thereby assess the accuracy of the gauge.

13. The gauge assessment apparatus of claim 12, wherein the remote portion is one of a tail portion and a hub portion.

14. The gauge assessment apparatus of claim 13, wherein the recording unit comprises a camera.

15. The gauge assessment apparatus of claim 14, wherein said camera is used to capture a video frame image containing the speedometer gauge needle in a deflected state, and wherein the video frame is analyzed in terms of intensity in order to locate the head portion and the remote portion.

16. The gauge assessment apparatus of claim 14, wherein said camera is used to capture a video frame image containing the speedometer gauge needle in a deflected state, and wherein the video frame is analyzed in terms of color in order to locate the head portion and the remote portion.

17. The gauge assessment apparatus of claim 13, wherein the processing unit comprises a scanner to scan at least a portion of the needle deflection to locate the head portion and the remote portion.

18. The gauge assessment apparatus of claim 17, wherein the scanner comprises a detecting circuit to detect maximum intensity locations corresponding to the head portion and the remote portion.

19. The gauge assessment apparatus of claim 12, wherein the recording unit comprises a scaling unit to scale the needle deflection.

20. The gauge assessment apparatus of claim 12, wherein the comparison unit further comprises a calibration unit.

21. The gauge assessment apparatus of claim 20, wherein the calibration unit further comprises a storage unit to store at least one compensation value, said compensation value being based on said actual needle deflection and said expected needle deflection.

22. The gauge assessment apparatus of claim 20, wherein the calibration unit further comprises an alignment unit to realign said needle.

23. A method of assessing the accuracy of a gauge having a needle that deflects in response to an input signal, comprising the steps of:

generating a predetermined gauge input signal;

applying the predetermined gauge input signal to a gauge;

recording a needle deflection of the gauge in response to the predetermined input signal;

analyzing the needle deflection to determine locations of a head portion of the gauge needle and a needle portion remote from said head portion;

determining an actual needle deflection based on the locations of the head portion and the remote portion; and comparing the actual needle deflection with an expected needle deflection corresponding to the predetermined gauge input signal to thereby assess the accuracy of the gauge.

24. The method of claim 23, wherein the recording step includes the further step of recording a visual image.

25. The method of claim 24, wherein the remote portion is one of a tail portion and a hub portion and the analyzing step includes the further step of scanning at least a portion of the needle deflection to locate the head portion and remote portion.

26. The method of claim 25, wherein the scanning step includes the further step of analyzing the visual image with respect to pixel intensities to locate the head portion and the remote portion.

27. The method of claim 26, wherein the step of analyzing the visual image with respect to pixel intensities includes the further step of analyzing the pixel intensities along at least one arcuate region within the visual image.

28. The method of claim 26, wherein the scanning step includes the further step of locating maximum intensity locations corresponding to the head portion and the remote portion.

29. The method of claim 25, wherein the scanning step includes the further step of analyzing the visual image with respect to color to locate the head portion and the remote portion.

30. The method of claim 27, wherein the step of analyzing the visual image with respect to color intensities includes the further step of analyzing the pixel intensities along at least one arcuate region within the visual image.

31. The method of claim 23, wherein the recording step includes the further step of scaling the needle deflection output.

32. The method of claim 23, wherein the comparing step includes the further step of calibrating said gauge.

33. The method of claim 32, wherein the calibrating step includes the further step of storing at least one compensation value, said compensation value being based on said actual needle deflection and said expected needle deflection.

34. The method of claim 32, wherein the calibrating step includes the further step of realigning said needle.

* * * * *